United States Patent
Handa et al.

(10) Patent No.: US 6,758,297 B2
(45) Date of Patent: Jul. 6, 2004

(54) TWO-WHEEL-DRIVE/FOUR-WHEEL-DRIVE SWITCHING SYSTEM FOR VEHICLE

(75) Inventors: Akio Handa, Saitama (JP); Hiroaki Tomita, Saitama (JP); Shinji Goto, Saitama (JP); Akio Senda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/320,378

(22) Filed: Dec. 17, 2002

(65) Prior Publication Data

US 2003/0234130 A1 Dec. 25, 2003

(30) Foreign Application Priority Data

Dec. 26, 2001 (JP) ........................................ 2001-394335

(51) Int. Cl.[7] .......................................... B60K 17/354
(52) U.S. Cl. ........................................................ 180/247
(58) Field of Search ................................ 180/247, 248, 180/249, 250

(56) References Cited

U.S. PATENT DOCUMENTS 4,677,867 A * 7/1987 Sumihi ........................ 74/332
5,038,884 A * 8/1991 Hamada et al. ............. 180/233
5,183,132 A * 2/1993 Fujisawa ..................... 180/247
6,620,073 B2 * 9/2003 Kazaoka et al. ............ 475/231
6,634,978 B2 * 10/2003 Banno et al. ............... 475/222

FOREIGN PATENT DOCUMENTS

| JP | 3-159880 | * 7/1991 | ............ B62D/7/14 |
|----|----------|----------|-----------------------|
| JP | 10-297313 A | 11/1998 | |
| JP | 11-001131 A | 1/1999 | |

* cited by examiner

Primary Examiner—Avraham Lerner
(74) Attorney, Agent, or Firm—Birch, Stewart, Kolasch & Birch, LLP

(57) ABSTRACT

A two-wheel-drive/four-wheel-drive switching system for a vehicle wherein noise is reduced and a state of drive can be securely indicated. A two-wheel-drive/four-wheel-drive switching system for a vehicle is provided with a switching unit provided to either of power transmission mechanisms connecting an engine and front wheels, and the engine and rear wheels via final reduction gear units for enabling or disabling the transmission of power in the power transmission mechanism. An indication control member is provided for detecting that the transmission of power is made in the power transmission mechanism and illuminates an indicator wherein the indication control means detects a phase difference in revolutions between a pair of final reduction gear units and illuminates or turns off the indicator when the phase difference is in a predetermined range.

14 Claims, 11 Drawing Sheets

FIG. 3(a)     ELECTROMAGNETIC CLUTCH TURNED OFF
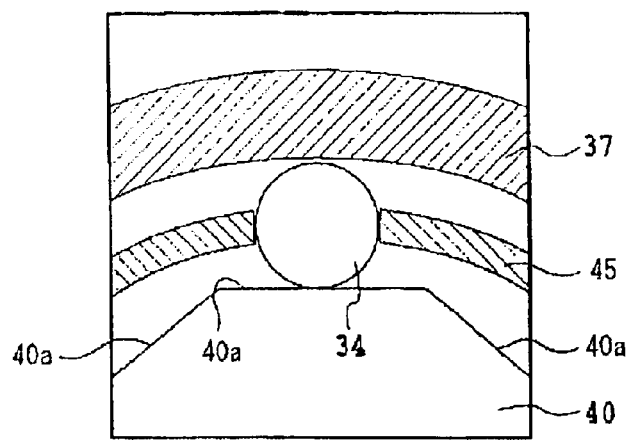
FIG. 3(b)     ELECTROMAGNETIC CLUTCH TURNED ON
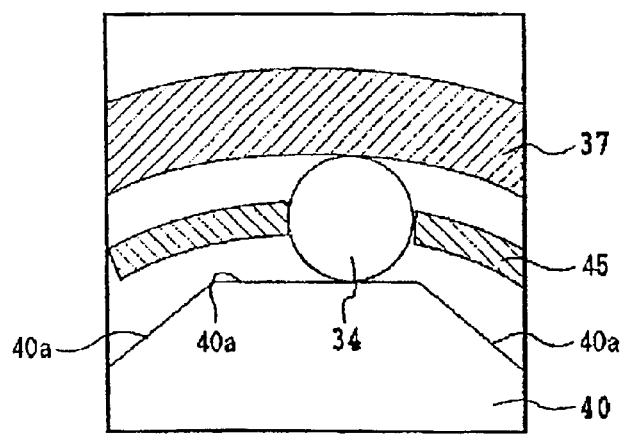

TWO-WHEEL-DRIVE/FOUR-WHEEL-DRIVE SWITCHING SYSTEM FOR VEHICLE

CROSS-REFERENCE TO RELATED APPLICATIONS

The present nonprovisional application claims priority under 35 USC 119 to Japanese Patent Application No. 2001-394335 filed on Dec. 26, 2001 the entire contents thereof is hereby incorporated by reference.

BACKGROUND OF THE INVENTION

1. Field of the Invention

The present invention relates to a two-wheel-drive/four-wheel-drive switching system for a vehicle.

2. Description of Background Art

Heretofore, a vehicle is known which can switch between two wheel drive and four wheel drive.

FIGS. 4 and 5 show an example of a vehicle for switching between two wheel drive and four wheel drive. The vehicle 1 is mainly composed of a body frame 3 in the center of which an engine 2 is mounted. Front wheels 4 and rear wheels 5 are arranged on both sides of the front and the rear of the body frame 3 with a steering handlebar 6 arranged on the upside of the front of the body frame 3 for steering the front wheels 4. A fuel tank 7 is attached to the body frame 3 and a seat 8 attached in the rear of the fuel tank 7.

A final reduction gear unit for the front wheel 13 and a final reduction gear unit for the rear wheel 14, respectively, are coupled to the engine 2 via propeller shafts 11 and 12 and are provided in the center of the front and the center of the rear of the body frame 3.

Drive shafts 9 are coupled to the right and the left of the final reduction gear unit 13 for the front wheels 4. The front wheels 4 are attached to the drive shafts 9 via wheel hubs 10 attached to the ends of the drive shafts.

Axle housings 22 into which drive shafts for the rear wheel 5 are inserted are provided to the right and the left of the final reduction gear unit for the rear wheel 14 and the rear wheels 5 are attached via wheel hubs 23 arranged at the ends of the axle housings 22 and coupled to the drive shafts.

A two-wheel-drive/four-wheel-drive switching system for switching a state of rear wheel drive and a state of four wheel drive by connecting or disconnecting power transmitted to the front wheels 4 is provided between the final reduction gear unit for the front wheel 13 and the propeller shaft 11, for example.

In the alternative, the two-wheel-drive/four-wheel-drive switching system may be also provided between the propeller shaft 12 in the rear and the final reduction gear unit for the rear wheel 14 to switch a sate of front wheel drive and a state of four wheel drive.

The states of drive are switched according to a state of a road and an operating state.

The two-wheel-drive/four-wheel-drive switching system is proposed in Japanese published unexamined patent applications No. Hei 11-1131 and No. Hei 10-297313, for example, and FIG. 7 shows the structure.

The two-wheel-drive/four-wheel-drive switching system 15 shown in FIG. 7 is shown by axially dividing an input shaft 16 of a final reduction gear unit for a front wheel 13 into two and is composed of two input shaft components 16a and 16b matched on the same axis and a switching unit 17 for connecting or disconnecting the shafts.

In more detail, a cylindrical positioning protrusion 18 protrudes from the center of the end face of the input shaft component 16a positioned on the side of the final reduction gear unit 13 for the front wheels 4. A positioning concave portion 19 is provided into which the positioning protrusion 18 is fitted so that the positioning protrusion can revolve. The positioning concave portion 19 is formed in the center of the end face of the input shaft component 16b and positioned outside. Both input shaft components 16a and 16b are positioned on the same axis by matching both input shaft components 16a and 16b so that the positioning protrusion 18 and the positioning concave portion 19 are fitted and are coupled so that they can revolve relatively easily.

Splines S1 and S2 are formed on the surfaces of the respective matched parts of both input shaft components 16a and 16b and the switching unit 17 is provided so that the switching unit surrounds the matched parts.

The switching unit 17 is composed of a slidable switching ring 20 on the inside face of which a spline is formed, which is fitted to the matched parts of both input shaft components 16a and 16b and the spline of which is engaged or disengaged with/from the respective splines S1 and S2. A driving mechanism 21 is provided for selectively moving the switching ring 20 in a position in which the switching ring 20 is slid in the axial direction of both input shaft components 16a and 16b and is engaged with only one input shaft component 16a or in a position in which the switching ring 20 is simultaneously engaged with the splines S1 and S2 of both input shaft components 16a and 16b.

The two-wheel-drive/four-wheel-drive switching system 15 configured as described above turns into a state of two wheel drive in which only the rear wheels are driven by moving the switching ring 20 in one direction by the driving mechanism 21, engaging the switching ring with only one input shaft component 16a and disabling the transmission of driving force to the front wheels 4 and turns into a state of four wheel drive in which the switching ring 20 is engaged with the other input shaft component 16b by sliding the switching ring 20 in a state wherein the switching ring is engaged with one input shaft component 16a. Thus, driving force is transmitted to the front wheel 4 by coupling both input shaft components 16a and 16b and the front wheels 4 and the rear wheels 5 are simultaneously driven.

That is, as shown in FIG. 8, in a two wheel drive condition, the supply of driving current to the two-wheel-drive/four-wheel-drive switching system 15 is stopped and in a four wheel drive condition, driving current is continuously supplied.

In a four wheel drive condition, an indicator is illuminated so as to inform an operator that the current state of drive is four wheel drive. However, for a method of detecting a state of four wheel drive, a method may be provided of providing a detection switch that is turned on when the detection switch touches the switching ring 20 and a fork that moves the switching ring 20 while the switching ring 20 is moved to a position of four wheel drive and detecting that the detection switch is turned on.

Such a conventional type two-wheel-drive/four-wheel-drive switching system 15 has the following problem that needs to be improved.

That is, in case when the detection switch operated by the switching ring 20 and the fork is used to illuminate the indicator for showing a state of four wheel drive operation, an impact is applied to the detection switch and a noise may be produced every time a state of drive is switched.

The abrasion of the switch due to the impact has an effect upon the precision of the lighting of the indicator.

SUMMARY AND OBJECTS OF THE INVENTION

The invention is made in view of the problems of such a conventional type switch and the object of the present invention is to provide a two-wheel-drive/four-wheel drive switching system for a vehicle wherein noise is hardly made and a state of drive can be securely indicated.

A two-wheel-drive/four-wheel-drive switching system for a vehicle according to the present invention is provided with a switching unit provided to either of the power transmission mechanisms for connecting an engine and a front wheel via a final reduction gear unit and connecting the engine and a rear wheel via a final reduction gear unit for enabling or disabling the transmission of power in the power transmission mechanism. A control unit is provided that controls the drive of the switching unit and indication control means are provided that detects that the transmission of power in the power transmission mechanism wherein an indicator is illuminated so as to achieve the object of the invention. The indication control means detects a phase difference between the revolutions of a pair of final reduction gear units. When the phase difference is within a predetermined range, the indicator is illuminated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3(a) and 3(b) show the embodiment of the invention and are enlarged sectional views showing the main part for explaining the operation of a drive switching system;

DETAILED DESCRIPTION OF THE PREFERRED EMBODIMENTS

Referring to FIGS. 1 to 3, 6 and 9 to 11, one embodiment of the invention will be described below.

Figure 4:
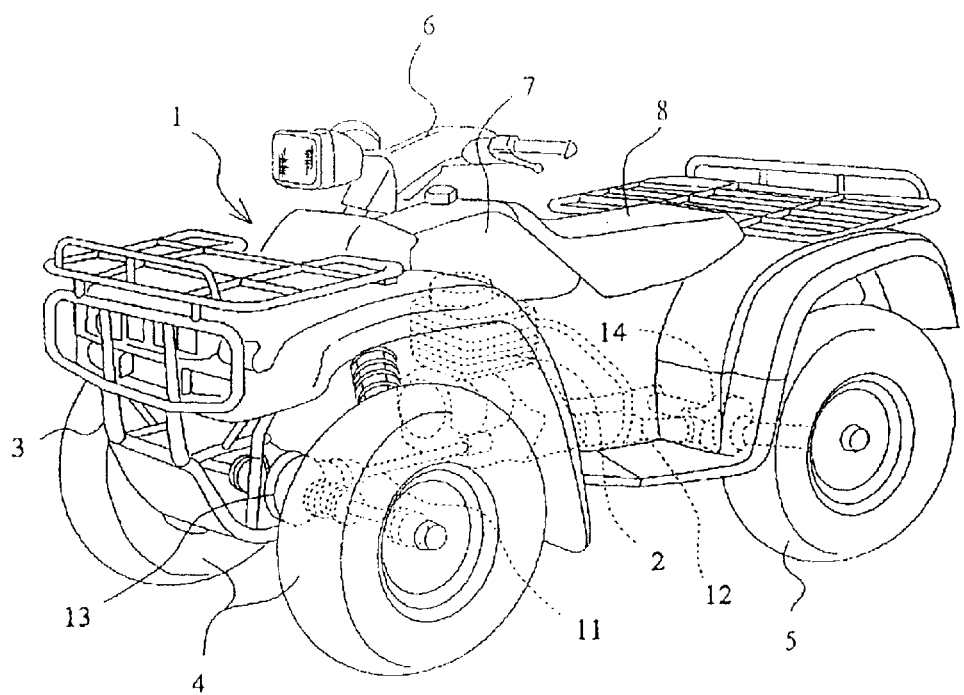
FIG. 4 is a perspective view showing an example of a vehicle provided with the two-wheel-drive/four-wheel-drive switching system.
Figure 5:
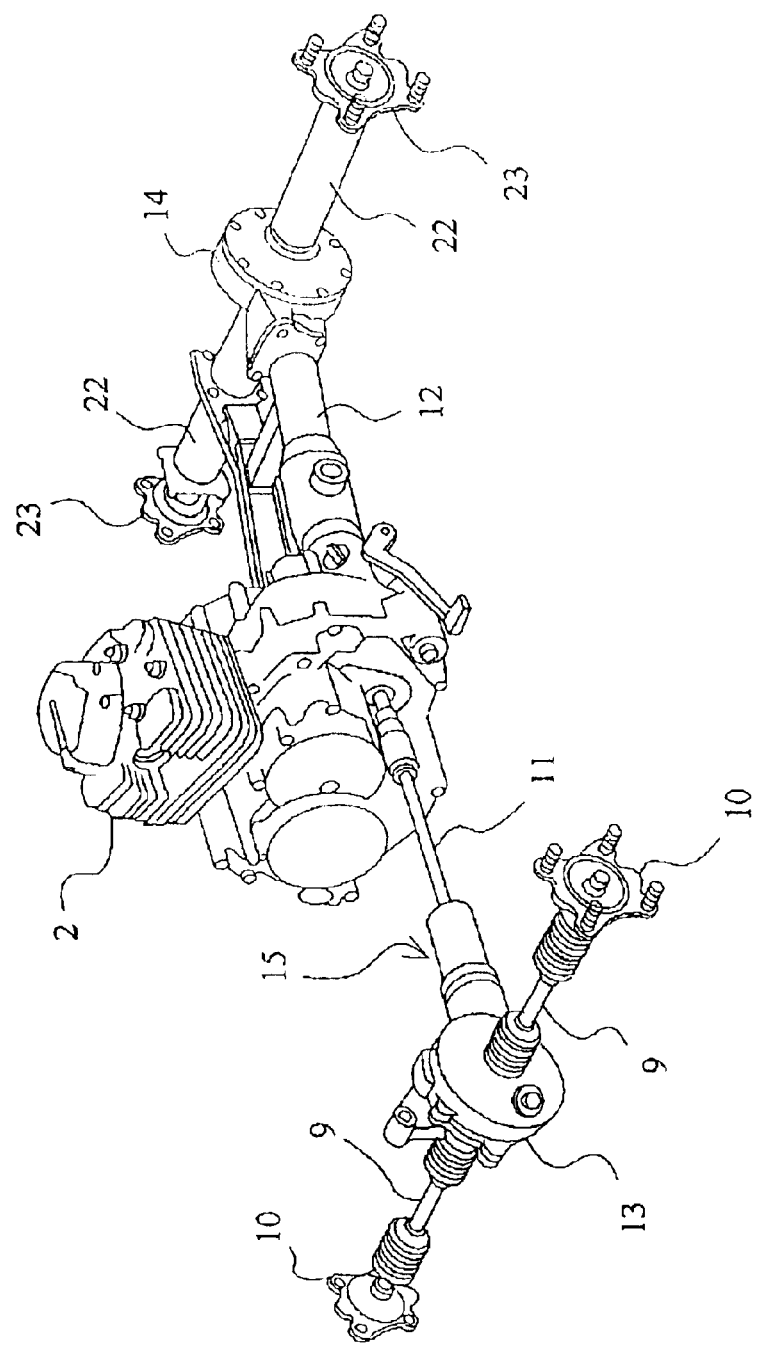
FIG. 5 is a perspective view showing the main part for explaining the configuration of the vehicle shown in FIG. 4.

In the following description, as a primary component of a vehicle in common in FIGS. 4 and 5, the same reference number is used to simplify the description.

Figure 1:
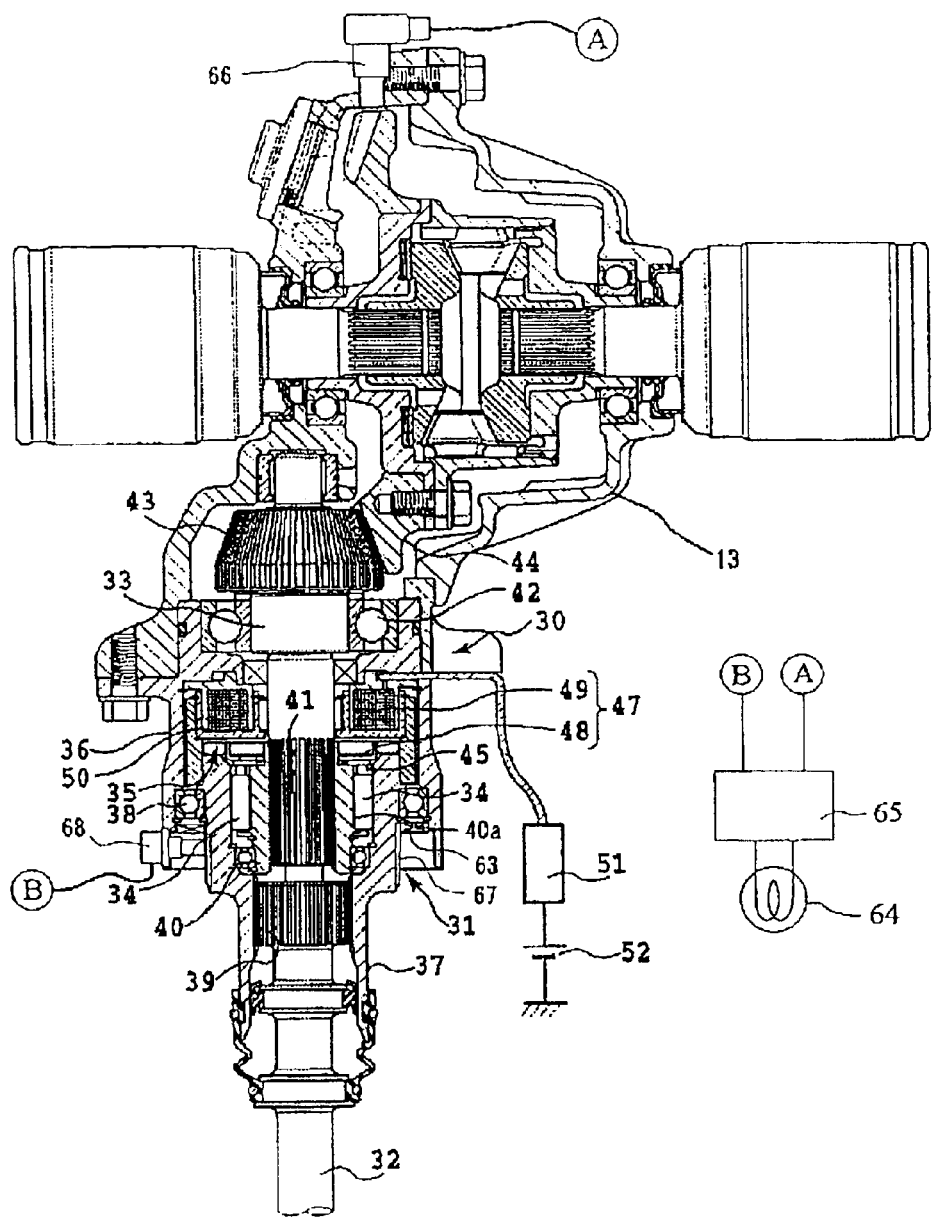
FIG. 1 is a sectional view showing one embodiment of the invention.

A two-wheel-drive/four-wheel-drive switching system 30 (hereinafter abbreviated as a drive switching system) equivalent to this embodiment and shown in FIG. 1 is provided for a power transmission mechanism provided between a front wheel 4 and an engine 2 and includes a switching unit 31 for enabling or disabling the transmission of power in the power transmission mechanism. The switching unit 31 is mainly composed of a driving shaft 32 coupled to the drive side, a driven shaft 33 fitted to the driving shaft 32 via a circular clearance, plural connecting/disconnecting members 34 inserted into the clearance between the driving shaft 32 and the driven shaft 33 for connecting or disconnecting the driving shaft 32 and the driven shaft 33 by being fitted or being detached to/from the opposite faces of the driving shaft and the driven shaft, a switching mechanism 35 for selectively locating the connecting/disconnecting members 34 in a position in which the driving shaft 32 and the driven shaft 33 are connected or in a position in which they are disconnected and a casing 36 surrounding the members.

Next, to explain more details, in this embodiment, a cylindrical outer ring 37 protrudes on the side of an engine 2 and is provided via a bearing 38 in the casing 36 so that the outer ring can revolve.

A spline 39 is formed on the inside face of the outer ring 37, and the driving shaft 32 and the outer ring 37 are coupled by inserting the driving shaft 32 into the outer ring 37 so that the driving shaft is engaged with the spline 39.

A prismatic inner ring 40 having a regular polygonal cross section is arranged inside the outer ring 37 with a circular interval having a predetermined width between the inner ring and the inside face of the outer ring 37.

The spline 41 is formed on the inner face of the inner ring 40 and the driven shaft 33 inserted into the casing 36 is coupled to the inner ring 40 via the spline 41.

An intermediate part in a longitudinal direction of the driven shaft 33 is supported by a bearing 42 attached to the casing 36 so that the output shaft can revolve.

A pinion gear 43 is integrated with the end of the driven shaft 33 and is engaged with a ring gear 44 of the final reduction gear unit for the front wheel 13.

Figure 2:
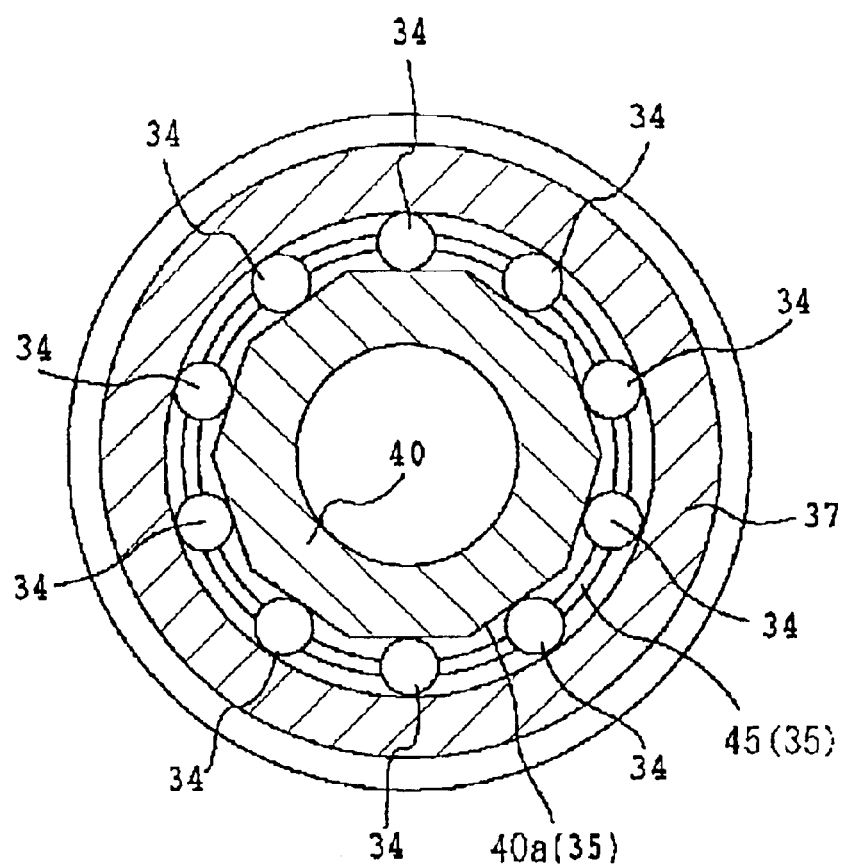
FIG. 2 shows the embodiment of the invention and is a longitudinal sectional view showing a main part.

The connecting/disconnecting members 34 forming the switching unit 31 are formed by plural rollers arranged in parallel with the axis of the outer ring 37 as shown in FIGS. 1 and 2, the switching mechanism 35 holds the connecting/disconnecting members 34 so that they can revolve and includes a retainer 45 attached to the outer ring 37 so that the retainer can revolve relatively easily (can be relatively moved axially). A cam face 40a is formed on the surface of the inner ring 40 for moving the connecting/disconnecting members 34 in the radial direction according to its relative movement with the retainer 45.

An electromagnetic clutch 47 forming the switching mechanism 35 for fixing or separating the retainer 45 and the outer ring 37 is provided on the end located inside the casing 36 of the outer ring 37.

The electromagnetic clutch 47 includes a clutch plate 48 inserted between the retainer 45 and the outer ring 37 and an electromagnetic coil 49 for pressing or separating the clutch plate 48.

The electromagnetic coil 49 connects the retainer and the outer ring by energizing the clutch plate 48 and thereby, fixes the retainer 45 and the outer ring 37 so that they cannot be turned relative to each other.

The electromagnetic coil 49 is circularly formed, is housed in a housing 50 that is also formed in a circular shape. A magnet core and the housing 50 are attached to the casing 36 so that the housing surrounds the driven shaft 33.

The outer ring 37, the inner ring 40 and the switching mechanism 35 are built and united in the casing 36 and are attached to the final reduction gear unit for the front wheel 13 by fastening the casing 36 onto a case of the final reduction gear unit 13 for the front wheels 4 by a bolt in a state in which the driven shaft 33 is installed as shown in FIG. 1.

A control unit 51 for controlling turning on/off the electromagnetic coil and a power source 52 for supplying power for driving the electromagnetic coil 49 are connected to the electromagnetic coil 49.

Figure 6:
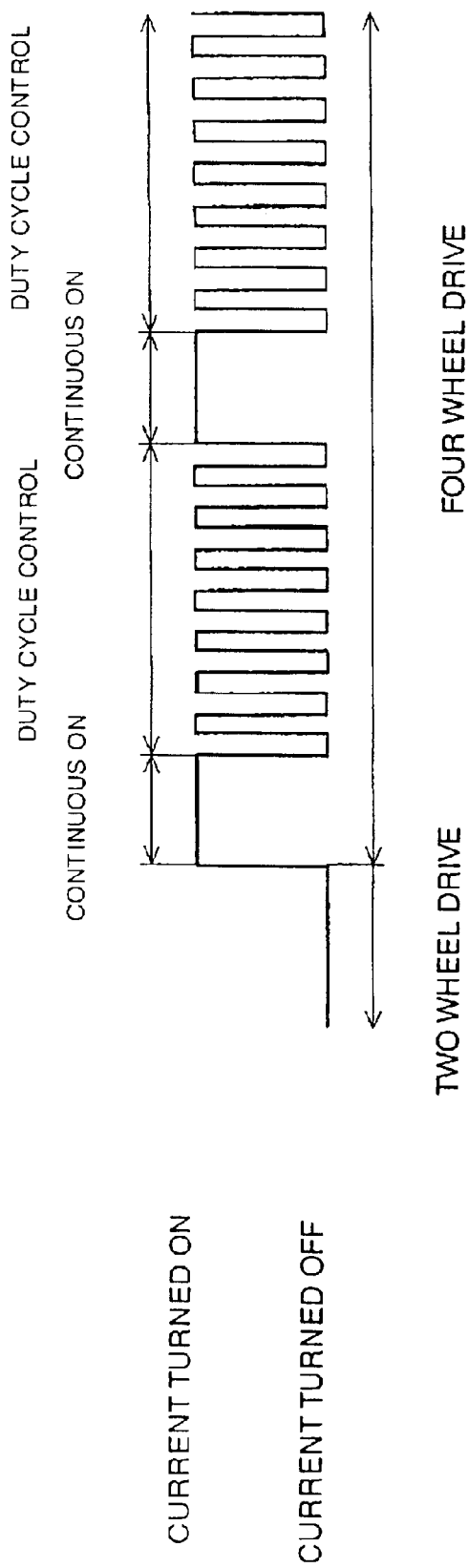
FIG. 6 shows the embodiment of the invention and shows a waveform of driving current supplied to a switching mechanism.
Figure 7:
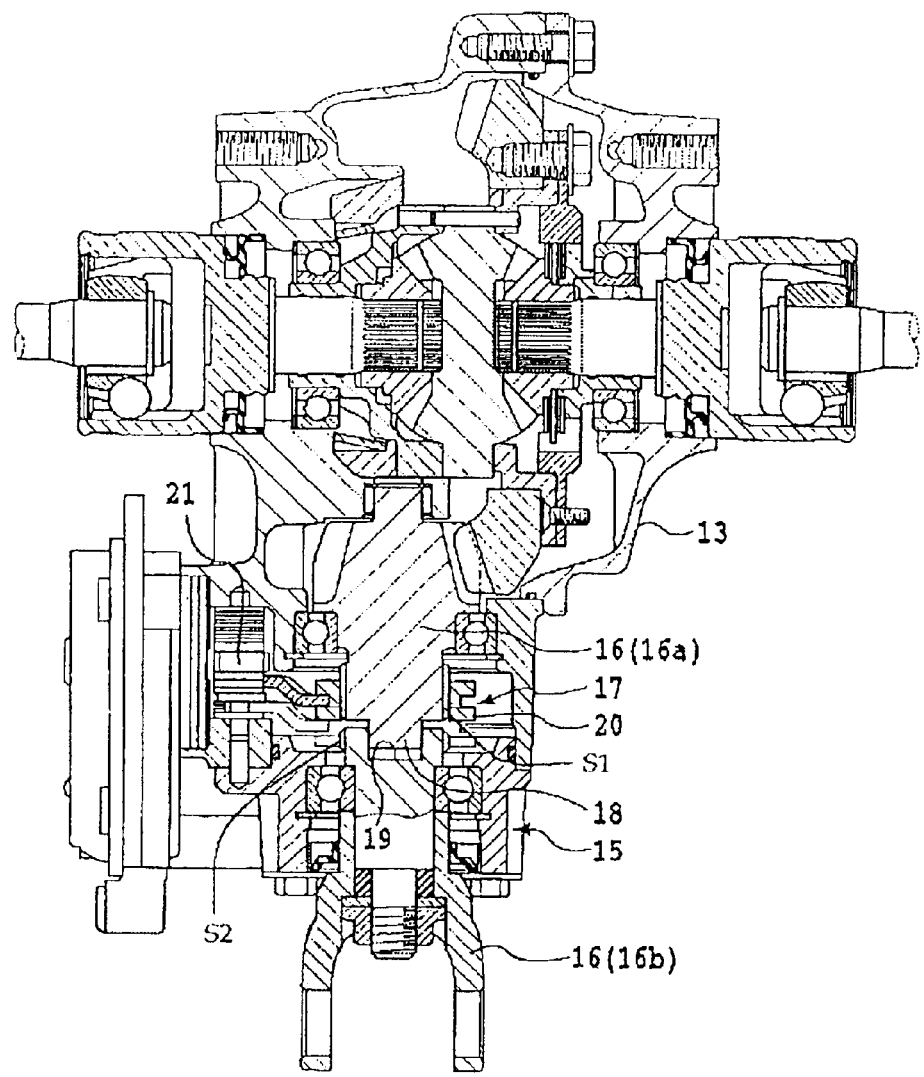
FIG. 7 is a sectional view showing a main part of one example of the structure of a conventional type two-wheel-drive/four-wheel-drive switching system.
Figure 8:
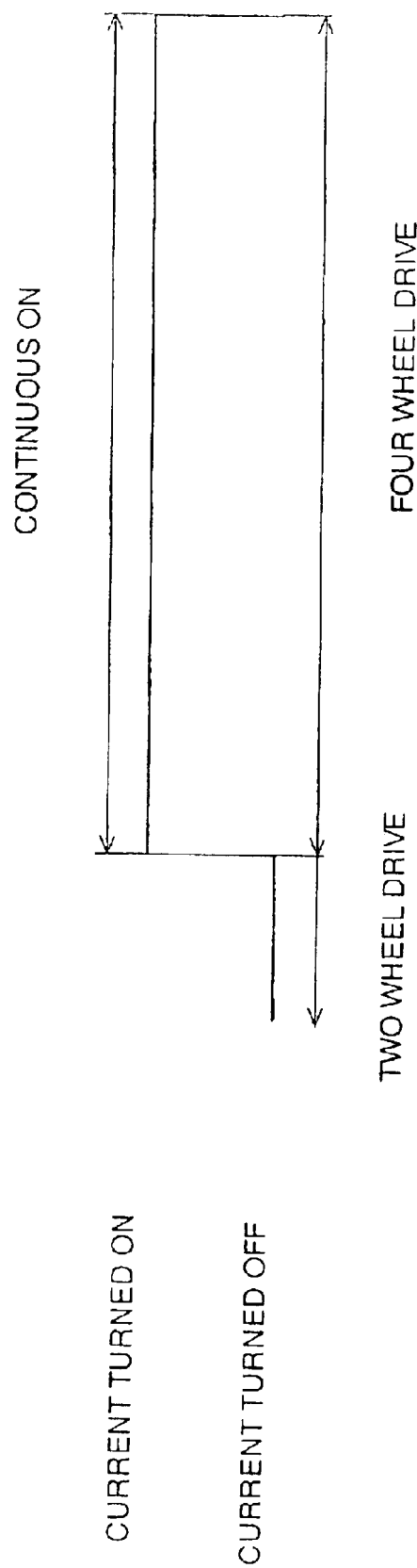
FIG. 8 shows a waveform of driving current supplied to the conventional type two-wheel-drive/four-wheel-drive switching system.

The control unit 51 repeats the continuous supply of driving current to the switching mechanism 35 in a four wheel drive operation and the supply according to a duty cycle control as shown in FIG. 6.

The ratio of the continuous supply time of driving current and the supply time according to the duty cycle control is suitably set according to a state of the operation of the internal combustion engine 2 and a state of a load and is set in a range in which a four wheel drive operation is prevented from converting to a two wheel drive operation due to the shortage of clutch pressure.

In FIG. 1 an oil seal is provided together with a dust seal 63.

In this embodiment, as shown in FIG. 1, an indicator 64 for indicating that power is transmitted in the drive switching system 30 is provided. Indication control means 65 are provided for detecting that the transmission of power is made and for illuminating the indicator 64.

The indication control means 65 detects a phase difference (phase difference between the revolutions of front and rear pinion gears) between the revolutions of a pair of final reduction gear units 13 and 14 and illuminates or turns off the indicator 64 when the phase difference is in a predetermined range.

Further in more detail, a phase difference is made between the final reduction gear unit 13 for the front wheels 4 and the final reduction gear unit 14 for the rear wheels 5.

That is, when the reduction gear ratio of the final reduction gear unit 13 for the front wheels 4 is A/B and the reduction gear ratio of the final reduction gear unit 14 for the rear wheels 5 is C/D in the case where each diameter (each circumference) of the front wheels 4 and the rear wheels 5 is equal, a difference is made between the peripheral velocity of the driven shaft 33 which functions as an input shaft to the final reduction gear unit 13 for the front wheels 4 and the peripheral velocity of the outer ring 37 integrally revolved with an input shaft in the final reduction gear unit 14 for the rear wheels 5 by substantially equalizing A/B to C/D in a state of a two wheel drive operation and phase difference is made between each revolution.

To detect a phase, in this embodiment, a front sensor 66 is provided for detecting the teeth of the ring gear 44 and for generating a pulse signal to the final reduction gear unit 13 for the front wheels 4 as shown in FIG. 1. A spline 67 having the same number of teeth as that of the pinion gear 43 is integrated with the input shaft 33 of the final reduction gear unit 13 for the front wheels 4 and is formed on the periphery of the outer ring 37. A rear sensor 68 is provided for detecting the spline 67 and generating a pulse signal.

Figure 9:
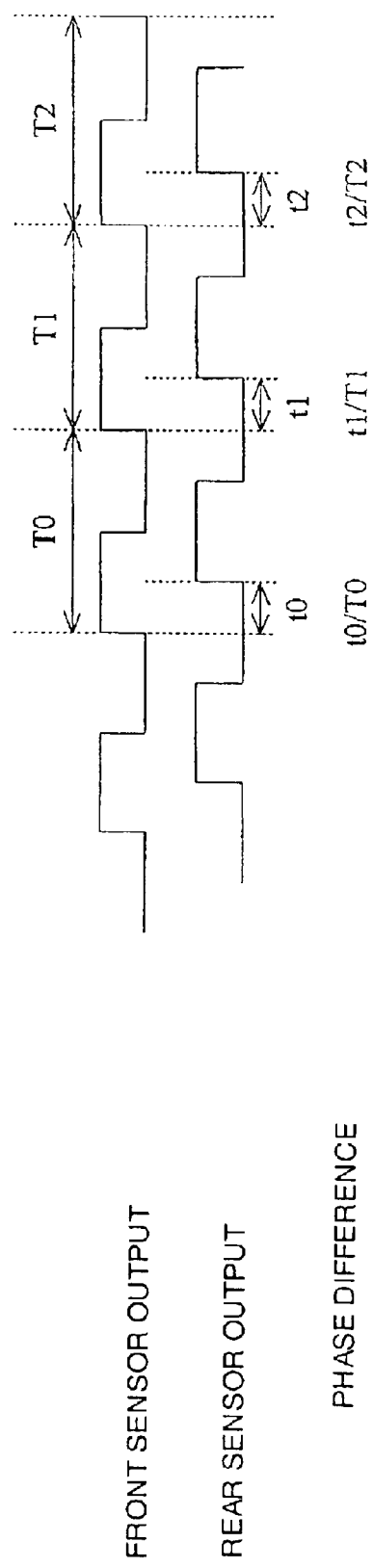
FIG. 9 shows correlation between pulses for explaining the action of the embodiment of the invention.

In the case when the drive switching system 30 is operated to be in a state of a four wheel drive operation, the outer ring 37 integrally revolved with the side of the rear wheels 5 and the driven shaft 33 on the side of the front wheels 4 are integrally revolved. However, at this time, difference shown by "t" in FIG. 9 is made between respective pulse signals detected by the front sensor 66 and the rear sensor 68.

The ratio t/T of the difference t in a phase in the cycle T of a pulse detected by the front sensor 66 is calculated and is acquired as a phase difference (phase difference between the driving shaft 32 and the driven shaft 33) between the front and the rear of the drive switching system 30.

The phase difference is calculated in the indication control means 65 based upon signals detected by both sensors 66 and 68.

The two-wheel-drive/four-wheel-drive switching system 30 equivalent to this embodiment and configured as described above disconnects the supply of power to the electromagnetic coil 49 to release the transmission of a driving force to the front wheels 4 and releases a fixation between the retainer 45 and the outer ring 37 by the electromagnetic clutch 47.

Thereby, as shown in FIG. 3(a), the connecting/disconnecting members 34 are located at the bottom of the cam 46 and are held in a position apart from the outer ring 37.

As a result, the outer ring 37 and the inner ring 40 are disconnected, the revolution of a driving shaft 32 is prevented from being transmitted to the driven shaft 33 and the transmission of a driving force to the front wheels 4 is released.

To turn into a state for four wheel drive operation, the retainer 45 is fixed to the outer ring 37 by energizing the electromagnetic coil 49 and letting in the electromagnetic clutch 47.

Thereby, the connecting/disconnecting members 34 held by the retainer 45 are moved together with the outer ring 37, are moved at the top of the cam 46 formed on the inner ring 40 as shown in FIG. 3(b) and touch the inner face of the outer ring 37.

As a result, the outer ring 37 and the inner ring 40 are coupled via the connecting/disconnecting members 34, as a result, the driving shaft 32 and the driven shaft 33 are coupled, the revolution of the driving shaft 32 is transmitted to the driven shaft 33 and the transmission of the driving force to the front wheel 4 is started.

In the drive switching system 30 equivalent to this embodiment and configured as described above, as the transmission of power is enabled by putting the connecting/disconnecting members 34 between the outer ring 37 and the inner ring 40, impulsive sound is extremely small and as a result, noise made in switching states of drive can be reduced.

As the switching unit 31 is united and is fixed to the final reduction gear unit 13 for the front wheels 4, the switching unit can be built without a great change with respect to the existing structure.

The driving shaft 32 and the driven shaft 33 can be connected or disconnected even if there is a difference in peripheral velocity between the front wheels 4 and the rear wheels 5. A complex auxiliary mechanism such as a synchronizing mechanism is not required to be provided and in this way, the configuration is also simplified.

As a driving current is supplied to the switching mechanism 35 by repeating the continuous supply and the supply according to the duty cycle control in the case where the vehicle 1 is in a state of four wheel drive operation as described above, the power consumption is reduced, compared with a case of only the continuous supply and as a result, a generator and battery are miniaturized.

In the meantime, while the vehicle 1 is operating, pulse signals are detected by the front sensor 66 and the rear sensor 68 and a phase difference is calculated in the indication control means 65 based upon the detected signals.

Figure 10:
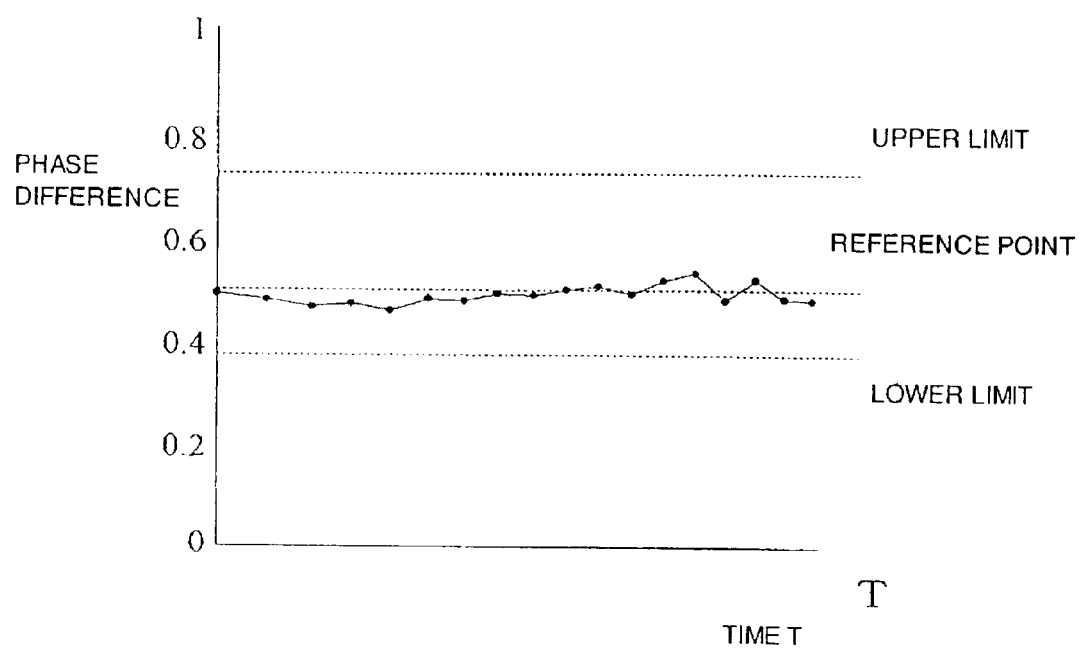
FIG. 10 shows the embodiment of the invention and shows the variation of phase difference in four wheel drive.
Figure 11:
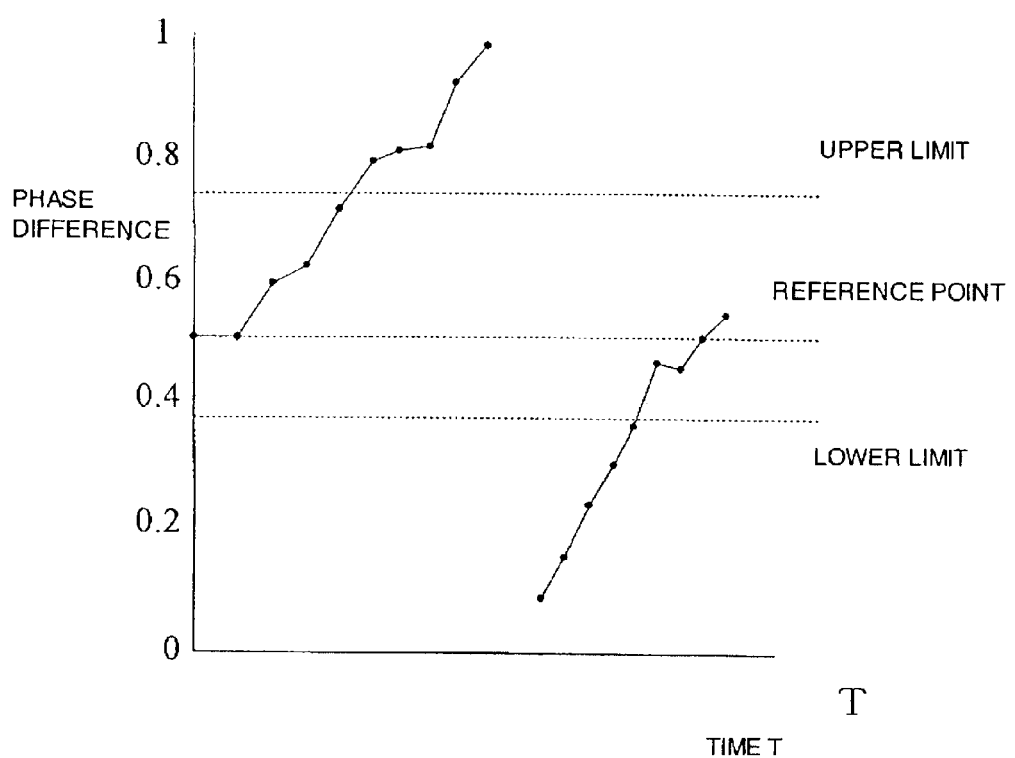
FIG. 11 shows the embodiment of the invention and shows the variation of phase difference in two wheel drive.

In a state of four wheel drive operation, the phase difference is held in a predetermined range as shown in FIG. 10 and in a state of two wheel drive operation, the phase difference sequentially varies as shown in FIG. 11 and reaches outside the predetermined range as shown in FIG. 11.

As described above, as it is judged that the current state of drive is a state of four wheel drive in the case where the phase difference varies in the predetermined range, the indicator 64 is illuminated by the indication control means 65. Thus, an operator is informed that the vehicle is operating under four wheel drive.

As it is judged that the current state of drive is a state of two wheel drive operation when the phase difference reaches outside the predetermined range, the indicator 64 is turned off by the indication control means 65. Thus, an operator is informed that the vehicle is operating under two wheel drive.

As a state of drive is detected without contact when in either a state of two wheel drive or a state of four wheel drive and an operator is informed by the indicator 64 described above, noise made in the conventional type is prevented from being produced and the state of drive can be substantially directly detected by using the phase difference.

The shape and the dimensions of each component described in the embodiment are one example and can be varied according to requirements of design.

For a method of making the phase difference, it is considered that A/B is equalized to C/D and the diameter (the circumference) of the front wheels 4 and that of the rear wheels 5 are differentiated.

An object detected by the front sensor 66 may also be the pinion gear 43 or may also be the drive shaft, the wheel hub, respectively, integrally revolving with the front wheels 4, a rim and further, the revolution of a tire.

Further, the spline 67 may also be formed in the engine 2, the final reduction gear unit 14 for the rear wheels 5, an axle shaft for the rear wheels 5, the wheel hub or the rim. An object detected by the rear sensor 68 may also be the revolution of the rear wheels 5.

The rear sensor 68 may also function as a speed sensor.

As described above, the invention is provided with the indication control means for detecting that the transmission of power is made in the power transmission mechanism and illuminating the indicator. As the indication control means detects the phase difference in the revolutions between the front and rear final reduction gear units and illuminates the indicator when the phase difference is in the predetermined range, a state of drive is detected without contact. Thus, noise produced in the conventional type mechanism is prevented from being produced. The state of drive can substantially be directly detected by using the phase difference. As a result, the indicator can be precisely operated according to the state of drive.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheel-drive/four-wheel-drive switching system for a vehicle, comprising:

a switching unit provided to either of power transmission mechanisms connecting an engine and a front wheel, and the engine and a rear wheel via final reduction gear units for enabling or disabling the transmission of power in the power transmission mechanism;

a control unit that controls the drive of the switching unit; and indication control means for detecting that the transmission of power is made in the power transmission mechanism and for illuminating an indicator;

wherein the indication control means detects phase difference between each revolution of a pair of final reduction gear units and illuminates or turns off the indicator when the phase difference is in a predetermined range.

2. The two-wheel-drive/four-wheel-drive switching system for a vehicle according to claim 1, and further including a front sensor for detecting rotation of a gear rotated by a driven shaft and for generating a pulse signal for supply to the indication control means.

3. The two-wheel-drive/four-wheel-drive switching system for a vehicle according to claim 1, and further including a rear sensor for detecting rotation of a spline rotated by a driving shaft and for generating a pulse signal for supply to the indication control means.

4. The two-wheel-drive/four-wheel-drive switching system for a vehicle according to claim 3, and further including an electromagnetic clutch for selectively supplying rotation between said driving shaft and a pinion gear.

5. The two-wheel-drive/four-wheel-drive switching system for a vehicle according to claim 4, wherein said electromagnetic clutch includes a clutch plate and an electromagnetic coil for selectively engaging a switching mechanism for supplying rotation between said driving shaft and the pinion gear.

6. The two-wheel-drive/four-wheel-drive switching system for a vehicle according to claim 3, and further including a pinion gear, wherein a pinion spline is operatively formed at one end of said pinion gear for providing rotation to said pinion gear from said driving shaft.

7. The two-wheel-drive/four-wheel-drive switching system for a vehicle according to claim 5, wherein said switching mechanism includes an inner ring, an outer ring and a retainer being positioned therebetween, for selectively supplying rotation between said driving shaft and said pinion gear.

8. A switching system for use with a two-wheel-drive/four-wheel-drive for a vehicle, comprising:

a switching unit for selectively connecting power to a front wheel and/or a rear wheel of a vehicle;

a control unit for controlling the operation of the switching unit; and indication control means for detecting that power is supplied to only the front wheel or the rear wheel or to both the front and rear wheels and for illuminating an indicator;

wherein the indication control means detects a phase difference between each revolution of a gear unit for rotating a front wheel or a rear wheel and illuminates the indicator when both a front wheel and a rear wheel are supplied with power or turns off the indicator when only a front wheel or a rear wheel is supplied with power.

9. The switching system for a two-wheel-drive/four-wheel-drive for a vehicle according to claim 8, and further including a front sensor for detecting rotation of a gear rotated by a driven shaft and for generating a pulse signal for supply to the indication control means.

10. The switching system two-wheel-drive/four-wheel-drive for a vehicle according to claim 8, and further including a rear sensor for detecting rotation of a spline rotated by a driving shaft and for generating a pulse signal for supply to the indication control means.

11. The switching system two-wheel-drive/four-wheel-drive for a vehicle according to claim 10, and further including an electromagnetic clutch for selectively supplying rotation between said driving shaft and a pinion gear.

12. The switching system two-wheel-drive/four-wheel-drive for a vehicle according to claim 11, wherein said electromagnetic clutch includes a clutch plate and an electromagnetic coil for selectively engaging a switching mechanism for supplying rotation between said driving shaft and the pinion gear.

13. The switching system two-wheel-drive/four-wheel-drive for a vehicle according to claim 10, and further including a pinion gear, wherein a pinion spline is operatively formed at one end of said pinion gear for providing rotation to said pinion gear from said driving shaft.

14. The switching system two-wheel-drive/four-wheel-drive for a vehicle according to claim 12, wherein said switching mechanism includes an inner ring, an outer ring and a retainer being positioned therebetween, for selectively supplying rotation between said driving shaft and said pinion gear.

* * * * *